US008900463B2

(12) United States Patent
Sowerby et al.

(10) Patent No.: US 8,900,463 B2
(45) Date of Patent: Dec. 2, 2014

(54) SELF-DISPOSAL OF SOLIDS IN AN IMMISCIBLE LIQUID SEPARATOR

(75) Inventors: Richard H. Sowerby, Kelowna, British Columbia (CA); Rafael A. Carreras, British Columbia (CA); John Sowerby, Pagosa Springs, CO (US); Douglas F. Samuelson, Frisco, TX (US); Jonathan Owen, Southport, Merseyside (GB)

(73) Assignee: Goslyn, LP, McKinney, TX (US)

( * ) Notice: Subject to any disclaimer, the term of this patent is extended or adjusted under 35 U.S.C. 154(b) by 418 days.

(21) Appl. No.: 13/374,274

(22) Filed: Dec. 20, 2011

(65) Prior Publication Data

US 2012/0152864 A1    Jun. 21, 2012

Related U.S. Application Data

(60) Provisional application No. 61/425,141, filed on Dec. 20, 2010.

(51) Int. Cl.
| | | |
|---|---|---|
| *B01D 17/032* | (2006.01) | |
| *B01D 21/24* | (2006.01) | |
| *C02F 1/40* | (2006.01) | |
| *B01D 17/02* | (2006.01) | |
| *E03F 5/16* | (2006.01) | |
| *B01D 21/02* | (2006.01) | |
| *C02F 1/00* | (2006.01) | |
| *C02F 101/32* | (2006.01) | |

(52) U.S. Cl.
CPC .............. *B01D 17/0214* (2013.01); *E03F 5/16* (2013.01); *B01D 21/2416* (2013.01); *B01D 21/10* (2013.01); *B01D 21/245* (2013.01); *C02F 1/40* (2013.01); *C02F 2001/007* (2013.01); *C02F 2101/32* (2013.01)

USPC ........ 210/803; 210/519; 210/523; 210/532.1; 210/540

(58) Field of Classification Search
CPC ............... B01D 17/0214; B01D 21/10; B01D 21/2416; B01D 21/245; C02F 1/40; C02F 2001/007; C02F 2101/32; C02F 2103/32; E03F 5/16
USPC .............. 210/800, 801, 803, 519, 523, 532.1, 210/533, 534, 535, 538, 540
See application file for complete search history.

(56) References Cited

U.S. PATENT DOCUMENTS

| | | | |
|---|---|---|---|
| 1,645,093 A | | 10/1927 | Comyn |
| 1,694,668 A | * | 12/1928 | Peters ........................... 210/533 |
| 1,741,187 A | * | 12/1929 | Fuqua ........................... 210/519 |

(Continued)

FOREIGN PATENT DOCUMENTS

EP    0890381    1/1999

*Primary Examiner* — Christopher Upton
(74) *Attorney, Agent, or Firm* — Roger N. Chauza, PC

(57) ABSTRACT

A separator for separating oils from waste water and solids. Waste liquids are drained into a baffle tube of the separator so that the oils rise and the waste water and solids migrate to the bottom of the separator. A collection head having a restriction is located at the bottom of the separator and is adapted for suctioning the waste water and the solids therein and carrying the same to a discharge outlet of the separator. Waste liquids drained into the separator provide the hydraulic force to accelerate the waste water and solids into the collection head. Liquids drained into the separator also provide the hydraulic force that allows the oils to be drained from the top of the separator.

20 Claims, 8 Drawing Sheets

(56) References Cited

U.S. PATENT DOCUMENTS

| | | |
|---|---|---|
| 2,642,995 A | 6/1953 | Brenner |
| 2,732,944 A * | 1/1956 | Hays .................. 210/534 |
| 3,785,126 A * | 1/1974 | Smitherman .......... 210/534 |
| 3,933,654 A | 1/1976 | Middelbeek |
| 4,064,054 A | 12/1977 | Anderson et al. |
| 4,113,617 A | 9/1978 | Bereskin et al. |
| 4,123,365 A | 10/1978 | Middelbeek |
| 4,406,789 A * | 9/1983 | Brignon ................ 210/519 |
| 4,422,931 A | 12/1983 | Wolde-Michael |
| 5,021,153 A | 6/1991 | Haws |
| 5,435,924 A * | 7/1995 | Albertson ............. 210/803 |
| 5,494,586 A | 2/1996 | Inoue |
| 5,505,860 A | 4/1996 | Sager |
| 5,552,050 A * | 9/1996 | Valentin ............... 210/540 |
| 5,705,055 A | 1/1998 | Holloway, Jr. et al. |
| 5,837,152 A * | 11/1998 | Komistek et al. ..... 210/801 |
| 5,840,198 A | 11/1998 | Clarke |
| 6,371,308 B1 * | 4/2002 | Zhou ................... 210/532.1 |
| 6,491,830 B1 | 12/2002 | Batten et al. |
| 6,517,715 B1 | 2/2003 | Batten et al. |
| 6,551,516 B1 | 4/2003 | Castleberry |
| 6,645,387 B2 * | 11/2003 | Naski et al. ........... 210/540 |
| 6,849,176 B1 | 2/2005 | Batten et al. |
| 6,920,984 B2 * | 7/2005 | Agnew ................. 210/533 |
| 6,951,615 B2 | 10/2005 | Tripodi et al. |
| 7,153,439 B1 | 12/2006 | Batten et al. |
| 7,284,670 B2 * | 10/2007 | Schmid ................. 210/523 |
| 7,297,284 B2 | 11/2007 | Owen et al. |
| 7,331,472 B2 | 2/2008 | Seregin et al. |
| 7,431,852 B2 | 10/2008 | Batten et al. |
| 7,540,967 B2 | 6/2009 | Batten et al. |
| 7,617,940 B2 * | 11/2009 | Gramme et al. ....... 210/519 |
| 7,682,509 B2 | 3/2010 | Murray et al. |
| 2003/0024866 A1 | 2/2003 | Wang |
| 2005/0016937 A1 * | 1/2005 | Smullin ................. 210/800 |
| 2006/0219629 A1 * | 10/2006 | Noestheden ........... 210/519 |

* cited by examiner

SELF-DISPOSAL OF SOLIDS IN AN IMMISCIBLE LIQUID SEPARATOR

RELATED APPLICATION

This non-provisional patent application claims the benefit of U.S. provisional application filed Dec. 20, 2010, Ser. No. 61/425,141.

TECHNICAL FIELD OF THE INVENTION

The present invention relates in general to apparatus that separates immiscible liquids, and more particularly to water/oil separation apparatus that separates solids and automatically disposes of the solids.

BACKGROUND OF THE INVENTION

The preparation of foods in commercial and residential kitchens results in wastes of many types. The largest volume of waste in such an environment is water which is used in the preparation of many vegetable and animal foodstuffs. The unused portions of the ingredients are often flushed down the kitchen sink drain, or processed into smaller particles by a garbage disposal unit. Vegetable oils and animal fats are also by-products of preparing meals. By most accounts, these wastes are often flushed down the sink drain and left to be processed by the municipal utility companies. The environmental concerns of flushing such organic material down the drain are significant, in that the waste liquid must be processed by sewage or water treatment plants before being reused or released to rivers, lakes, or the like. If not treated, the fats, oils and grease (FOG) can build up in private and city drain systems and require eventual cleaning which is costly and often interrupts service to the users. It is of primary importance that the FOG by-products not be flushed down drains into septic systems, as this can interrupt or stop the bacterial action and render the system unusable. As such, it is a better practice to require each user to remove the FOG liquids from the waste water before the water is released to the community or private water treatment system. The FOG liquid can be recycled to produce usable by-products, or otherwise processed and returned to the environment as a biodegradable material.

The disposal of wastes down the drain by residents of homes and apartments has generally been an acceptable practice to date. The residents are often urged not to place FOG products down the drain, but such practice is voluntary. As noted above, the processing of FOG products in waste water by waste water treatment authorities becomes more costly and requires additional equipment. As the population becomes more dense in city and suburban areas, the treatment and disposal of FOG material becomes more critical, more necessary and more costly. The failure to properly dispose of the FOG material could have an adverse impact on the health in the local community.

In many restaurants and food processing plants, the FOG by-products are removed from the waste water by using a holding tank that is of sufficient size to allow the waste liquid to remain undisturbed long enough so that the FOG liquid rises to the top. An inverted weir located on the bottom portion of the tank allows the waste water to be drained off, while the solids migrate to the bottom of the tank. As the separation process continues, the depth of the FOG liquid increases and leaves less volume in the tank for the waste water and solids. Eventually, the FOG liquid must be drained off and disposed of in a responsible manner so that the tank can again operate efficiently. Periodically, the solids must be removed from the tank manually in order to restore it to the original operating capacity.

Other waste disposal systems are equipped to remove the collected FOG liquid from the separation chamber by either mechanical or hydrostatic means in order to maintain the efficiency of the device at a high level. The problems with the solids and silts are addressed by the use of catch baskets which separate the solids from the waste water. It can be appreciated that with a finer screen in the catch basket less particulate matter passes through, but the catch basket must be manually cleaned more frequently. With a coarse screen, the catch basket requires emptying less frequently, but more particulate matter passes therethrough. The removal of the catch basket by a person is not a pleasant job and thus is often neglected until absolutely necessary. This situation leads to the degradation of the organic solids until they begin to smell, which is unacceptable and undesirable in either the private or commercial setting. The FOG material must be disposed of, and in the restaurants setting, can be a daily routine carried out by staff members.

From the foregoing, it can be seen that a need exists for a waste disposal system which separates the waste water and solids from the FOG liquid, and then automatically disposes of the waste waster and solids together, while allowing the FOG liquid to be collected and removed from the system when needed. Another need exists for a waste disposal system that requires no electrical driven apparatus in order to provide the separation capabilities, and no moving parts that would otherwise wear and require maintenance or replacement. Yet another need exists for a waste disposal system that employs the hydrostatic forces available in such type of system to provide the force and suction necessary to carry the solids with the waste water to the utility drain system, and to also provide the force to drain the FOG liquid into a container for disposal thereof.

SUMMARY OF THE INVENTION

In accordance with the principles and concepts of the invention, there is disclosed a separator that uses the hydraulic force of liquids drained therein to suction waste water and solids from the bottom of the separator and carried to a discharge outlet at the top of the separator. The hydraulic forces of liquids drained into the separator also move the separated oils out of an outlet for proper disposal.

In accordance with a feature of the invention, the separator includes a collection head located at the bottom thereof, where the collection head has a restriction therein that causes the waste water and solids to be suctioned therein due to the acceleration of the waste water drawn into the collection head.

In accordance with another feature of the invention, the separator includes an elongated perforated baffle tube into which the waste liquids are carried. The baffle tube can be constructed of a constant diameter or with various diameters. The perforations can be formed all along the baffle tube and may vary in sizes and in location. As the waste liquid flows through the baffle tube, the oils separate from the waste water and rise upwardly through the perforated baffle tube to the top of the separator. At the same time, the waste water and solids separate from the oils and migrate downwardly through the perforated tube to the bottom of the separator. The inertia effect of the larger volume within the main chamber slows the progress of the effluent within the elongated, curved baffle tube, thereby enabling the time needed to allow separation to occur. The baffle tube can vary in length, dimensions and shape.

With regard to yet another feature of the invention, the bottom of the separator is constructed with slanted sides which angle inwardly to a V-shaped bottom. The solids thus move downwardly in the separator along the inwardly slanted bottom sides and collect at the V-shaped bottom. The V-shaped bottom extends along the length of the bottom of the unit. The collection head is elongate and is positioned adjacent to the V-shaped bottom to effectively draw in the solids with the waste water and remove the same from the separator.

In accordance with an embodiment of the invention, disclosed is a separator for separating waste water and solids from oils, which includes an enclosure having an inlet for coupling an influent comprising waste water, solids and oil into the enclosure, where the oils rise to a top of the enclosure and the waste water and solids migrate to a bottom of the enclosure. Further included is a discharge outlet of the enclosure for carrying waste water and solids out of the enclosure. A FOG outlet of the enclosure couples oils separated from the waste water and solids out of the enclosure. The enclosure has a bottom area to which the solids migrate. A collection head is located adjacent to the bottom area of the enclosure. The collection head is shaped so that liquid drained into the enclosure via the inlet causes the waste water and solids in the bottom area to be suctioned therein. An outlet tube connects the collection head to the discharge outlet. Liquid drained into the enclosure via the inlet causes oils separated in the enclosure to move to the top of the enclosure and out of the FOG outlet.

In accordance with another embodiment of the invention, disclosed is a separator for separating waste water and solids from oils, which includes an enclosure having an inlet for an coupling an influent comprising waste water, solids and oil into the enclosure. The oils rise to a top of the enclosure and the waste water and solids migrate to a bottom collection area of the enclosure. Further included is an elongate tube having one end connected to the inlet, where the elongate tube has a length sufficient to provide a residence time in which the oils can separate from the waste water. The elongate tube has perforations therein for allowing the oils to migrate upwardly in the enclosure and for allowing the waste water and solids to migrate downwardly in the enclosure. Depending on the length and shape of the elongated perforated baffle tube, the perforations can be of the same size and different locations to properly and efficiently expulse the oils upwardly and the wastewater and solids downwardly. A discharge outlet of the enclosure carries the waste water and solids out of the enclosure, and a FOG outlet of the enclosure couples oils separated from the waste water and solids out of the enclosure. An outlet tube is connected to the discharge outlet, and a collection head is located adjacent to the bottom collection area of the enclosure. The collection head is connected to the outlet tube for carrying the waste water and solids from the bottom collection area of the enclosure to the discharge outlet. The liquids drained into the enclosure via the inlet cause oils separated in the enclosure to move to the top of the enclosure and cause the waste water and solids at the bottom collection area to be removed by the collection head to the discharge outlet.

In accordance with a further embodiment of the invention, disclosed is a method of processing a waste liquid in a separator to separate waste water and solids from oils. The method includes draining a waste liquid into a perforated tube of the separator to allow the oils to migrate upwardly through perforations in the tube, and to allow the waste water and solids to migrate downwardly through perforations in the tube. The action of the waste liquid drained into the separator is used to cause a suction to be developed in an area at the bottom of the separator to move the waste water and solids upwardly and out of a discharge outlet located in a top portion of the separator. The separated oils are drained from the top of the separator using a hydraulic force generated by draining a liquid into the separator.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
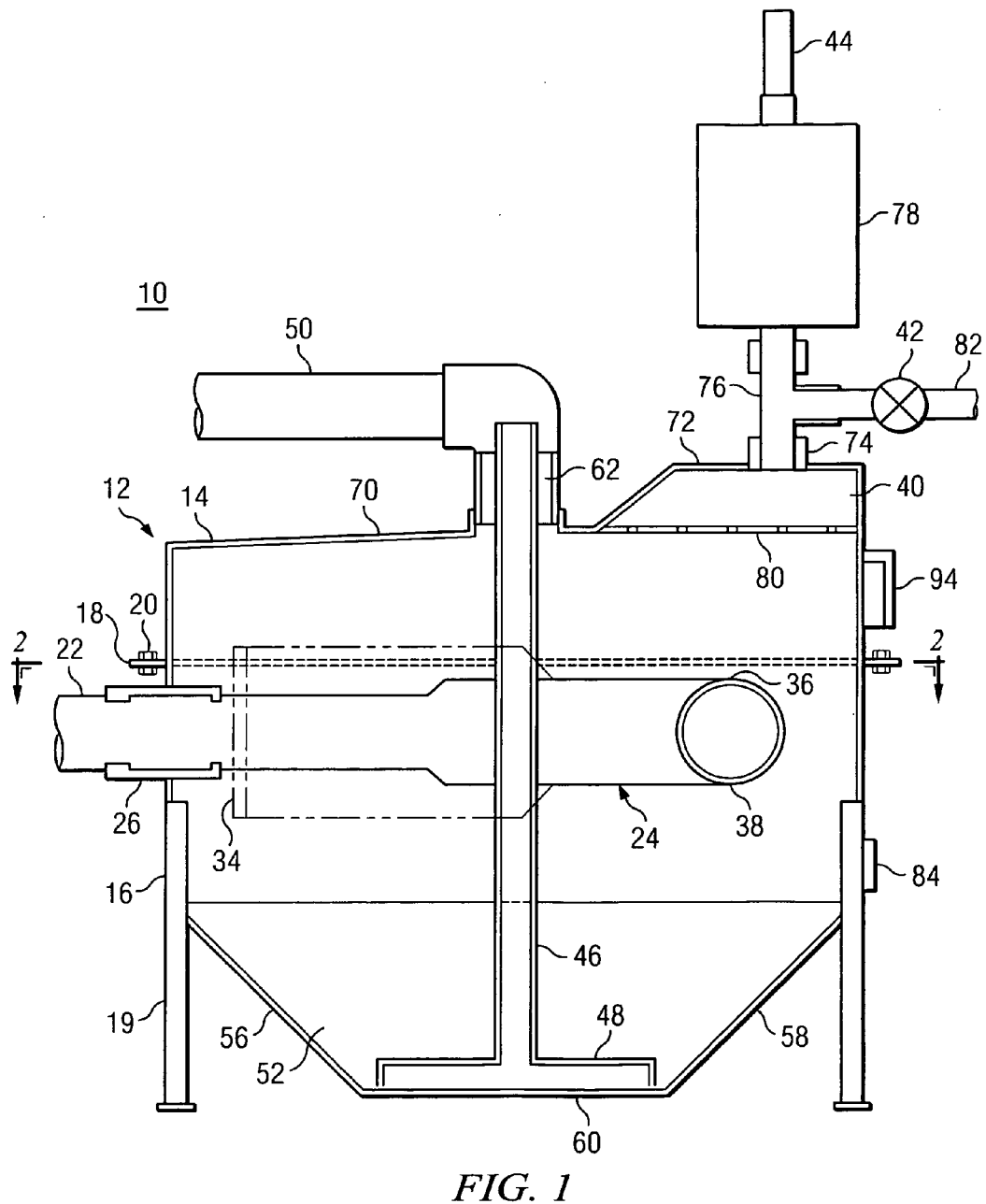
FIG. 1 is a cross-sectional view of one embodiment of a FOG disposal unit of FIG. 2.

With reference to FIGS. 1-7, there is illustrated a FOG disposal unit 10 constructed according to one embodiment of the invention. The FOG disposal unit 10 comprises an enclosure 12 having a top 14 and a bottom 16 that forms a closed container. The enclosure top 14 and bottom 16 are fastened together by way of mating top and bottom flanges 18 that are fastened together with bolts 20, or the like. An elastomeric or other suitable seal (not shown) is located between the flanges 18. In order to clean out the FOG disposal unit 10, the bolts 20 can be removed to allow the top 14 to be separated from the bottom 16. Alternatively, the top 14 and bottom 16 can be hinged together at one edge with a hinge. The top 14 and bottom 16 of the enclosure 12 can be constructed from a stainless steel metal, fiberglass, or other suitable material that is resistant to rust and deterioration when subject to waste liquids typically encountered in kitchens and food processing plants. The FOG disposal unit 10 can be constructed with four legs, one shown as numeral 19, to support the unit 10 in an upright position, as shown, on the floor or bottom shelf of a cabinet in which a sink is situated. Thus, the waste liquid from the sink can be drained by gravity directly into the FOG disposal unit 10. Similarly, for sinks that are equipped with a garbage disposal unit, the output thereof can be connected to the inlet 22 of the FOG disposal unit 10. A typical U-shaped drain trap can be omitted because it is not necessary, as the FOG disposal unit 10 functions as a conventional trap to prevent gasses from passing therethrough and into the kitchen.

The generalized operation of the FOG disposal unit 10 includes the coupling of the waste liquid to the inlet 22, and then to a perforated baffle tube 24. The length of the baffle tube 24 is sufficient so that after a resident time therein, the liquefied grease and oil rise and exit the baffle tube 24 and move to the top of the FOG disposal unit 10. The baffle tube 24 thus constitutes a primary separation area of the FOG disposal unit 10. The liquefied grease and oil are lighter in density than water and thus rise and collect in an oil reservoir 40, which is located at the top of the unit 10. During use, the oil and liquefied grease in the oil reservoir 40 continue to accumulate until drained off via the manually-operated valve 42. Attached to the top of the oil reservoir 40 is the vent 44 which allows air entrained in the influent to escape from the FOG disposal unit 10. The vent 44, as well as the pipe rising from the oil reservoir, is of a small cross-sectional area so as not to reduce the hydraulic or hydrostatic forces generated within the enclosure 12 when waste liquids are drained therein. A feature of the vent 44 is the larger diameter expansion chamber 78 which serves to prevent escaping air bubbles from propelling the liquid oil up and out of the vent 44. The solids carried in the waste liquid gravitate to the bottom of the baffle tube 24 and exit via perforations in the bottom thereof, and to the floor of the enclosure bottom 16. Since water and oil-type liquids are immiscible, the oil and liquefied grease in the influent rise in the FOG disposal unit 10. Water, on the other hand, being heavier in density than the oil and grease, tends to collect in the bottom of the FOG disposal unit 10. Any FOG liquid that is carried out of the bottom of the baffle tube 24 with the waste water and solids can be separated therefrom in the enclosure bottom 16 and then move upwardly to the enclosure top 14. The enclosure bottom 16 thus constitutes a secondary separation chamber of the FOG disposal unit 10.

An outlet pipe 46 extends to the enclosure bottom 16 and terminates in a collection head 48 which causes the velocity of the water pulled therethrough to increase, thereby lifting the solids from the floor of the enclosure bottom 16 upwardly and coupled to a discharge outlet 50 and out of the FOG disposal unit 10. Thus, every time waste liquids are drained from the sink into the FOG disposal unit 10, the hydraulic head generated by the incoming liquid causes water and wastes to be effectively vacuumed by the collection head 48 from the bottom 16 and drawn upwardly by the outlet pipe 46.

It should be noted that the enclosure 12 of the unit 10 is full of liquids during normal operation. While waste water and solids are disposed of every time waste liquids are drained from the sink, the liquefied grease and oil continues to accumulate in the FOG disposal unit 10 until drained off via the valve 42. As such, during operation, the liquid interface between the waste water and the overlying FOG liquid moves downwardly in the FOG disposal unit 10. The baffle tube 24 is thus always immersed in the waste liquid in the unit 10, and preferably in the waste water portion so that the liquefied grease and oil can move upwardly through the waste water and be collected at the top of the FOG disposal unit 10.

Figure 2:
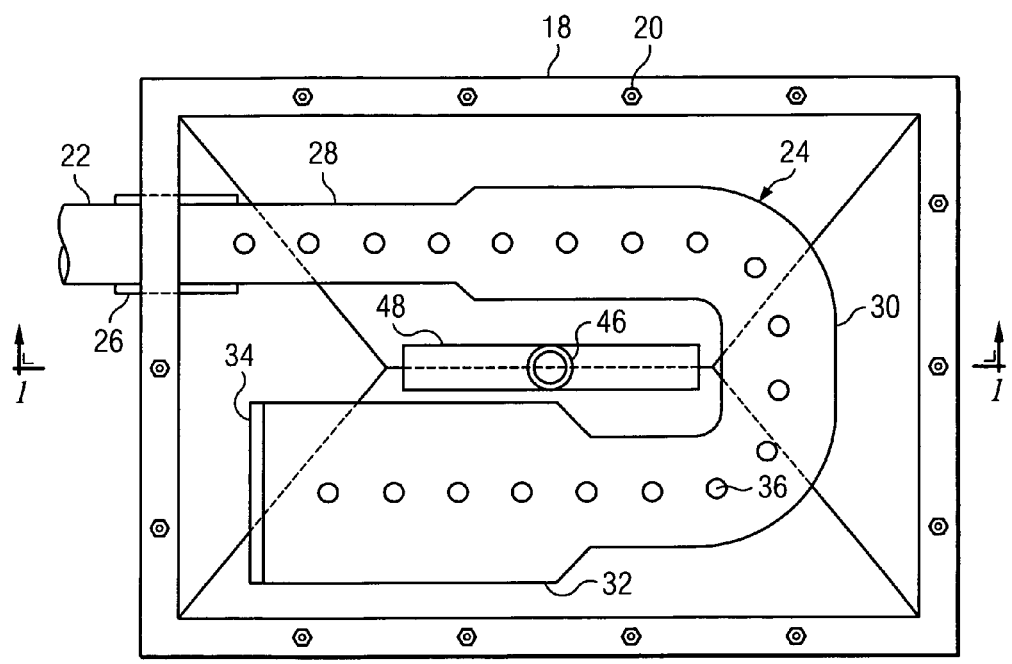
FIG. 2 is a horizontal cross-sectional view of the FOG disposal unit of FIG. 1.
Figure 3:
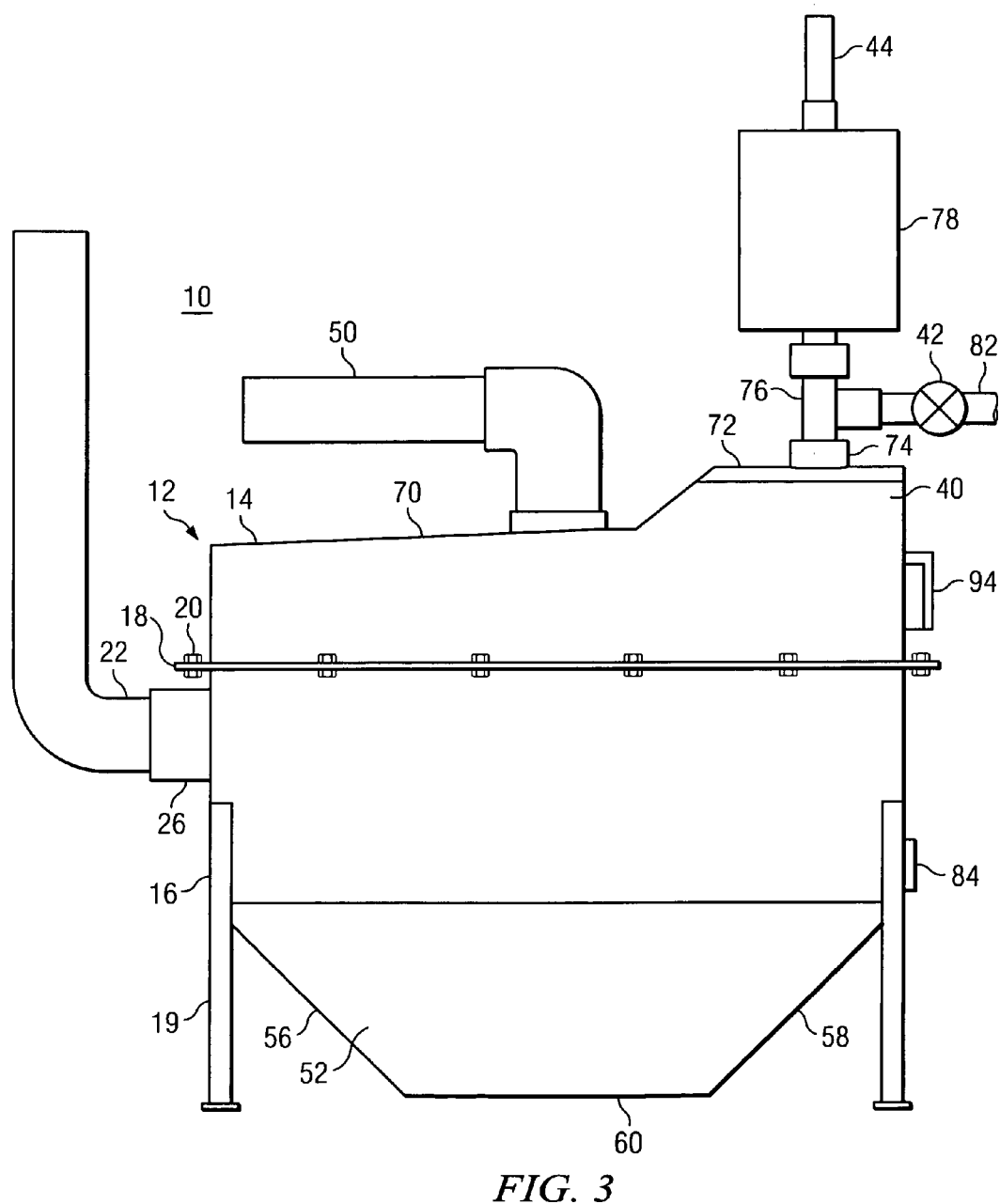
FIG. 3 is a side elevation view of the FOG disposal unit of FIG. 1.
Figure 4:
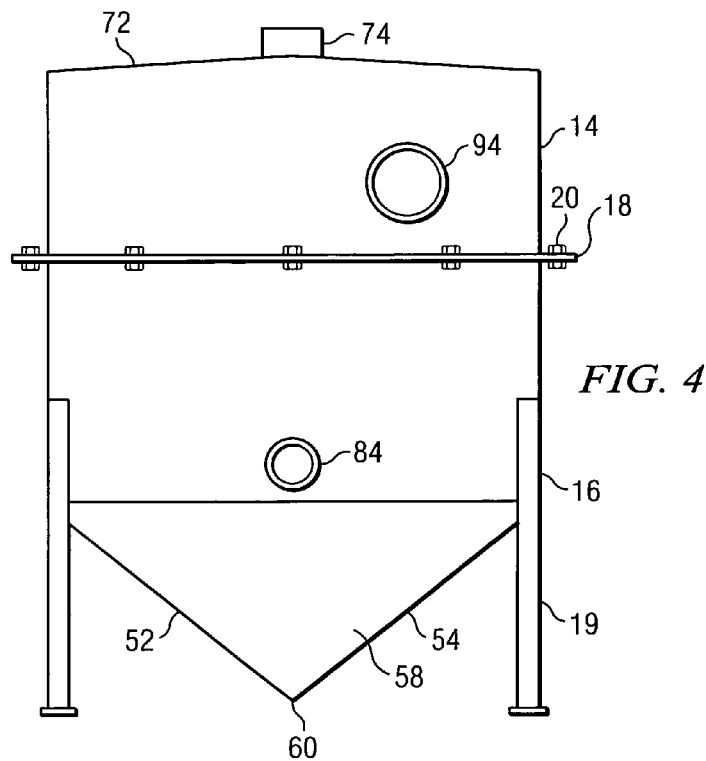
FIG. 4 is a back end view of the FOG disposal unit of FIG. 1.
Figure 5:
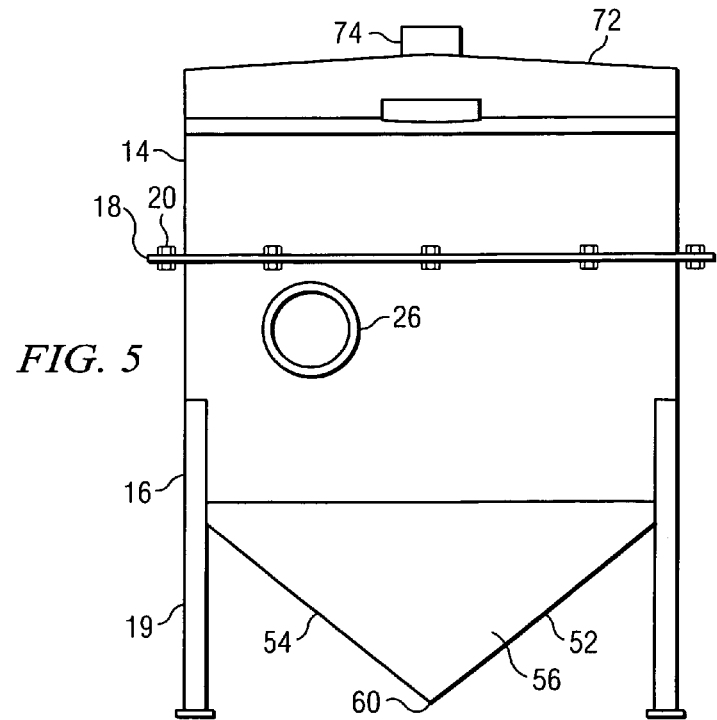
FIG. 5 is a front view of the FOG disposal unit of FIG. 1.
Figure 6:
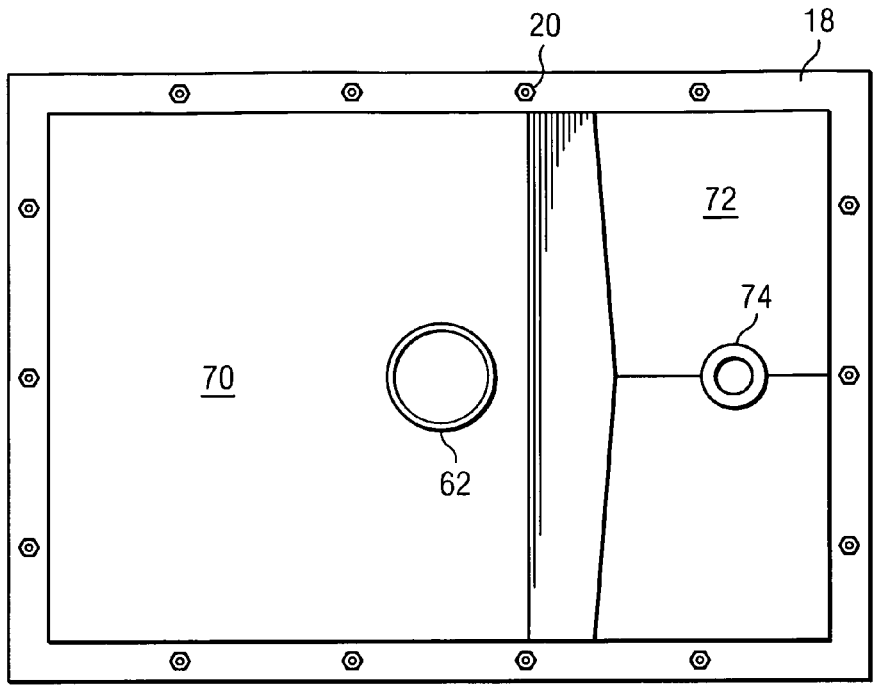
FIG. 6 is a top view of the FOG disposal unit of FIG. 1.

In more detail, the enclosure bottom 16 of the FOG disposal unit 10 includes the tubular inlet 22 connected to the U-shaped baffle tube 24 by a coupling 26. The inlet 22 is positioned high on the enclosure bottom 16, and is secured to the sidewall to support the baffle tube 24 which is positioned generally centrally between the vertical sidewalls of the enclosure bottom 16. The baffle tube 24 is a perforated enclosure and is constructed with graduated diameters, namely, an inlet smaller diameter section 28 located near the inlet 22, a larger diameter mid-section 30 which is U-shaped, and a further larger diameter end section 32 located at the end. This is shown in FIG. 2. The volume of the baffle tube 24 is thus a function of its length. The end section 32 is equipped with a cap 34 to prevent waste liquids and solids from escaping from the end of the baffle tube 24. Rather than being constructed of graduated diameters, the tube can be constructed with a cone shape where the diameter is gradually larger as a function of the length of the cone.

The baffle tube 24 is perforated and constructed of a PVC type of plastic or other suitable type of metal or synthetic material. The baffle tube 24 is fabricated with a number of holes, slots or other shaped perforations on both the top surface and on the bottom surface. The holes 36 are shown formed in the top surface of the baffle tube 24, and holes 38 are shown formed in the bottom surface of the baffle tube 24. The size of the top holes 36 is not critical, but are of sufficient size to allow liquid grease and oil to rise and exit the baffle tube 24. The length of the baffle tube 24 is sufficient to provide a residence time that allows the immiscible liquids to separate. It has been found that the residence time of waste liquids in the baffle tube 24 should be about 27 seconds for kitchen type wastes. To achieve an adequate length, the baffle tube 24 can also be circular, coiled in a spiral, serpentine or any other suitable shape. It can be appreciated that when the waste liquid enters the unit 10, the large droplets of FOG start to separate in the frontal baffle tube section 28 and, for the most part, the remaining immiscible liquid is separated when they reach the end 34 of the baffle tube section 32. The immiscible liquids that do not separate in the primary separation chamber, i.e., the baffle tube 24, exit therefrom and are separated in the secondary chamber. In order to allow the liquefied grease and oil to exit at every location in the baffle tube 24, the baffle tube 24 includes perforations or holes 36 all along the length thereof.

The holes 38 formed along the length of the bottom of the baffle tube 24 are more critical, in that they must be large enough to pass the particulate matter generally found in kitchen waste water. In the event a motor-driven garbage disposal unit is attached to the sink drain, then the size of the particulate matter would be smaller and thus the bottom holes 38 could be smaller. In any event, the size of the particulate matter holes 38 can be determined experimentally for different applications.

As noted above, the diameter of the baffle tube 24 gradually increases in size from the front to the back thereof. With an increased size of the baffle tube 24 as the waste liquid moves therein, the waste liquid tends to be less turbulent, thereby allowing the immiscible liquids to separate more efficiently. It can be appreciated that the separation of immiscible liquids is facilitated when the turbulence therein is minimized.

Figure 7:
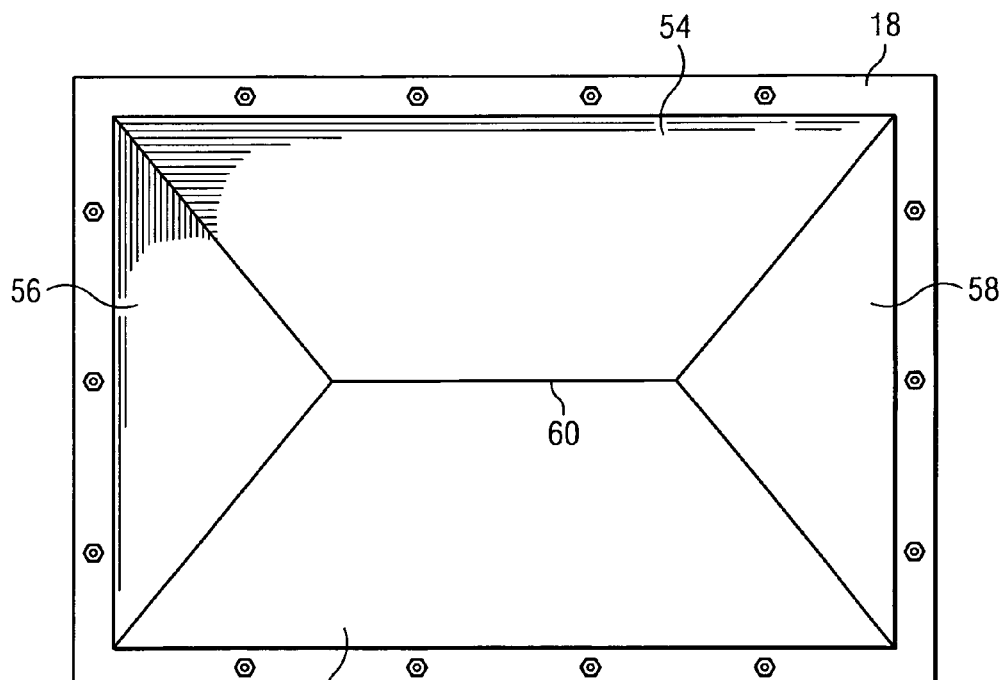
FIG. 7 is a bottom view of the FOG disposal unit of FIG. 1.

With regard to FIG. 7, a bottom view of the FOG disposal unit 10 is illustrated. The enclosure bottom 16 terminates with slanted opposing front and back sides 56 and 58, and with slanted opposing lateral sides 52 and 54. The four slanted sides 52-58 converge downwardly to a V-shaped collection throat 60 at the enclosure bottom. The slanted sides 52-58 facilitate the movement of solids downwardly in the enclosure bottom 16 to the collection throat 60. It has been experimentally found that an effective slanting of the sides 52-58 is about forty-five degrees, or greater. However, other angles can be utilized. A vibrator can be attached to the outer surface of one or more of the slanted sides to assist the movement of solids to the V-shaped collection throat 60.

Figure 8:
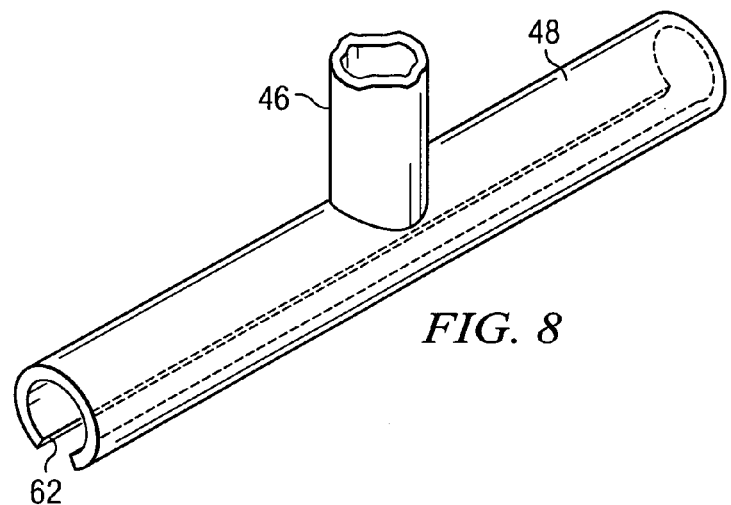
FIG. 8 is a bottom view of a collection head according to one embodiment.

FIG. 8 illustrates one embodiment of the water/solids collection head 48 that lies adjacent the collection throat 60 formed along the elongate juncture of the slanted sides 52-58. The collection head 48 can be constructed of a tubular PVC pipe connected via a T to the outlet pipe 46. The tubular pipe collection head 48 may or may not be capped at both ends, and includes a bottom slot 62 along its length. The slot 62 defines a restriction, or elongate orifice, to the flow of waste water therethrough. According to the principles of fluid dynamics, when waste liquids are coupled into the FOG disposal unit 10 through the larger diameter inlet tube 22, a hydraulic head is generated which tends to momentarily pressurize the unit 10 and force the liquid near the collection throat 60 into the collection head 48. With the slot 62 and the outlet pipe 46 restricting the flow of the waste water therethrough, the velocity of the entrained waste water increases. The increased velocity of the waste water entering into the collection head 48 effectively sweeps the solids from the collection throat 60 upwardly in the outlet pipe 46 and out of the discharge outlet 50. The solid particulate matter is thus vacuumed from the collection throat 60 and out of the FOG disposal unit 10.

The bottom of the collection head 48 is held close to the collection throat 60 to optimize the force of the suction. However, the collection head 48 should be spaced sufficiently from the collection throat 60 and the opposing slanted sides 52 and 54 to allow the solids to pass therebetween and to the collection throat 60. It is also noted that the outlet pipe 46 is of smaller diameter than the inlet pipe 22 to function as a restriction to the flow of liquid therethrough, thereby enhancing the suction created in the slot 62 or opening of the collection head 48. As can be appreciated, every time waste liquids are coupled into the FOG disposal unit 10 via the inlet pipe 22, the waste water and the solids are swept out of the bottom of the unit 10. The user of the FOG disposal unit 10 thus does not need to empty any particulate matter from the unit 10. It can also be appreciated that the particulate matter removed with the waste water is that matter which is heavier (greater density) than the liquefied grease and oil.

The outlet pipe 46 extends upwardly within the enclosure 12 and empties into the discharge outlet 50 which is larger in diameter. The top end of the outlet pipe 46 is sealed within the discharge outlet 50 with an elastomeric or other suitable type of seal. The outlet pipe 46 and the water/solids collection head 48 are thus fastened to the enclosure top 14 of the FOG disposal unit 10. When the enclosure top 14 and bottom 16 are separated at the respective flanges 18, the outlet pipe 46 and the water/solids collection head 48 can be removed with the enclosure top 14.

Figure 9:
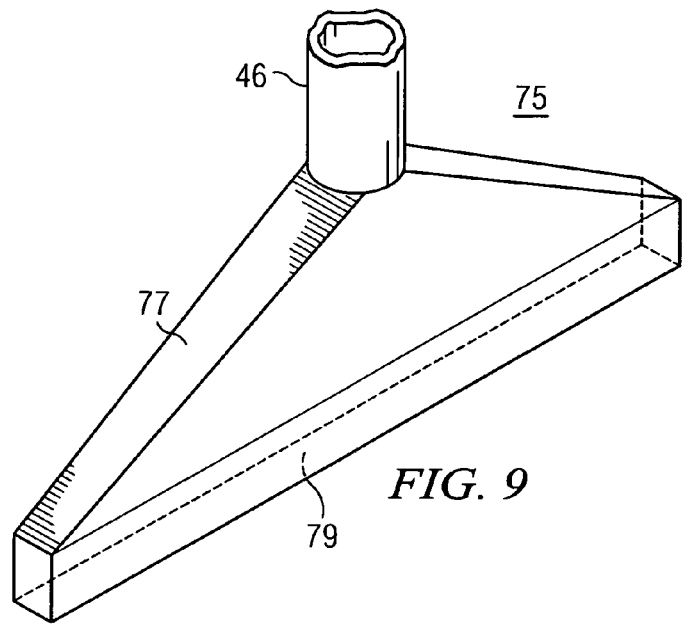
FIG. 9 is an isometric view of another embodiment of a collection head.

FIG. 9 illustrates another embodiment of a collection head 75. Here, the outlet pipe 46 is connected to a flared hood 77 that flares out to a length which is substantially the same as the length of the collection throat 60. The hood 77 of the collection head 75 functions to funnel the suctioned waste water and entrained solids upwardly and into the outlet pipe 46. The elongate inlet slot 79 at the bottom of the hood 77 functions as a restriction to thus accelerate the flow of liquids and solids therethrough. In view of the foregoing, many other configurations of collection heads can be fabricated by those skilled in the art.

Returning to FIG. 1, the enclosure top 14 of the FOG disposal unit 10 is constructed with a roof 70 that is inclined upwardly from the front of the unit 10 to the back thereof, with the front located at the inlet 22. With this construction, when the liquefied grease and oil rise above the waste water, the FOG liquid tends to move to the top and rear of the unit 10 where the FOG outlet of the oil reservoir 40 is located. The oil reservoir generally occupies the top of the FOG disposal unit 10, where the lighter weight FOG liquids are removed at the top back part of the unit 10. The roof 70 of the enclosure top 14 is constructed with a raised part 72 into which the liquefied grease and oil can rise. The top of the raised part 72, and more particularly the valve 42, is preferably lower than the waste water and solids discharged from the outlet 50. The top of the raised part 72 includes an outlet port 74 connected to a T fitting 76. The lateral outlet of the T fitting 76 is connected to the manually operated valve 42. The top outlet of the T fitting 76 is connected to an expansion chamber 78, and the outlet of the expansion chamber 78 is connected to the vent 44.

As noted above, the lateral outlet of the T fitting 76, and thus the valve 42, are preferably located at an elevation lower than the outlet pipe 50. This allows the liquefied grease and oil to be drained from the reservoir 40 when the valve 42 is opened and when water is run into the sink and drained into the FOG disposal unit 10. Otherwise, if the valve 42 were not located lower than the outlet pipe 50, the water drained from the sink would simply run through the FOG disposal unit 10 and out of the discharge outlet 50.

The entrance area of the raised part 72 of the reservoir 40 is covered with a screen or perforated plate 80 to prevent turbulence in the secondary chamber of the unit 10 from disturbing the liquefied grease and oil in the raised part 72 of the reservoir 40. The perforated plate 80 also prevents buoyant solids from entering the raised part 72 of the reservoir 40. When it is desired to drain off the liquefied grease and oil from the reservoir 40, the user need only place a sealable plastic bag or other suitable type of container under the outlet spout 82, turn on the tap water for a small stream, open the valve 42 and allow the liquefied grease and oil to drain from the reservoir 40 into the waste container. When the waste container is full, the valve 42 can be closed, the water tap turned off, and the waste container removed and properly disposed of. The unit 10 is then ready for continued use to separate the waste water and solids from the liquefied grease and oil. As noted above, the only components of the waste liquid that is coupled to the utility drain is the waste water and the solids. The liquefied grease and oil are collected separately and properly disposed of without draining the same to the utility drain system.

The FOG liquid can be drawn off via the valve 42 and into a cappable container, such as a plastic or other type of biodegradable container. The spout 82 can be of the type that has female threads to accept the externally threaded mouth of the disposable container. In addition, the spout 82 can be equipped with a small vent tube to vent the air out of the container when it is being filled via the opened valve 42. Once the container is full, the valve 42 can be closed and the full container can be removed and a cap screwed thereon. The capped container full of the FOG liquid can then be disposed of in a responsible manner.

When the user is draining waste water down the sink drain, air becomes entrained therein as bubbles. The air bubbles enter the baffle tube 24 and exit out of the top openings 36 and rise upwardly with the liquefied grease and oil. The entrained air bubbles migrate toward the oil reservoir 40 and exit through the expansion chamber 78 to the vent line 44 and are expelled into the atmosphere. The expansion chamber 78 functions to prevent droplets or films of oil from being carried with the air through the vent line 44.

It should be noted that since the outlet of the vent line 44 is located above the discharge outlet 50, even an excessive amount of oil in the FOG disposal unit 10 will not overflow through the vent line 44. Rather, an excessive amount of liquefied grease and oil will cause the interface between the waste water and the separated oil to be lowered in the enclosure 12, and eventually flow out of the outlet pipe 46 via the water/solids head 48. Thus, the failsafe state of one forgetting to empty the unit 10 of waste grease and oil is that the same will be coupled to the utility drain system, and not out of the vent line 44 and onto the floor or bottom shelf of the kitchen cabinet. The vent line 44 could easily be extended using a flexible tube within the kitchen cabinet. The top open end of the flexible tube would be at a level with the water level in a full sink. This would prevent fluids from being expelled even in the case of a blockage downstream from the separator unit 10.

In order to maintain grease and oil in a liquefied state, a thermostatically-controlled heater 94 can be employed in the oil reservoir 40. The heater 94 has a heating element immersed in the oil to maintain it at a temperature between about 100-102 degrees F. so that grease will not return to a solid state. The heater 94 can be of the electrical type that is plugged into a wall outlet, generally available below kitchen sinks.

The bottom 16 of the enclosure 12 can be equipped with a drain plug 84. If it is desired to open the unit 10 and clean the enclosure bottom 16 or replace components, the unit 10 can be partially drained via the plug 84. The drain plug 84 can also be located at other locations in the enclosure bottom 16, even on the slanted sides 52-58.

Figure 10:
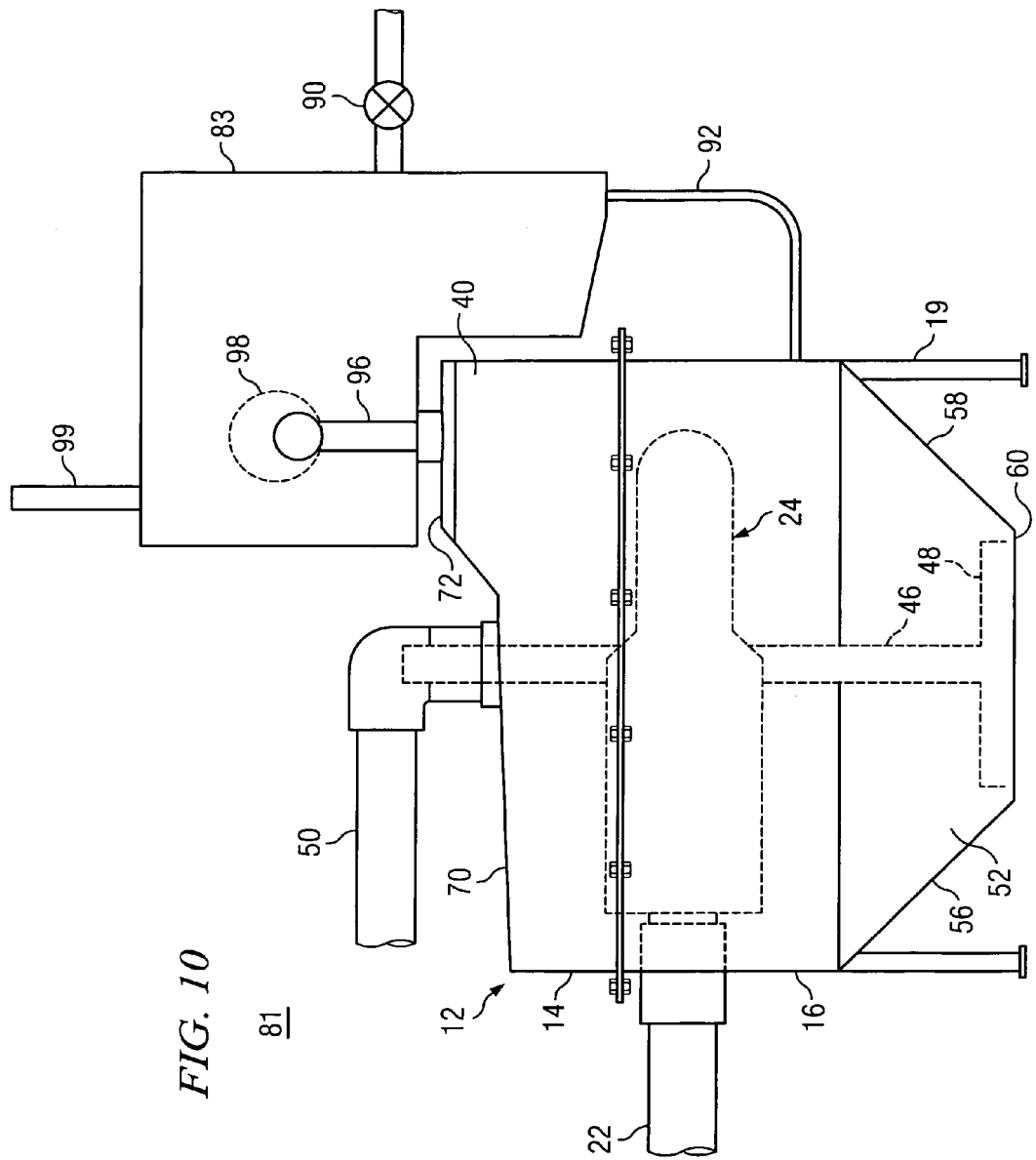
FIG. 10 is a side view of another embodiment of a FOG disposal unit.

FIG. 10 illustrates another embodiment of a FOG disposal unit 81. The unit 81 is substantially the same as that of FIGS. 1-7, but additionally includes a liquefied grease and oil storage vessel 83 that holds a substantial volume of the liquefied wastes that are heavier than the waste water processed through the unit 81. With a large storage vessel 83, the period of time in which it is necessary to draw off the liquefied grease and oil is extended. The storage vessel 83 is fastened to the enclosure 12 by means not shown. The waste grease and oil are forced into the storage vessel 83 via hydrostatic pressure in the enclosure 12 when waste liquids are drained therein from the sink. The waste grease and oil flow upwardly from the reservoir 40 through an upright pipe 96 and non-return valve 98 into the storage vessel 83. The non-return valve 98 can be of many types, including a ball and cage type or flapper type. The liquefied grease and oil that have been transferred to the storage vessel 83 cannot return to the reservoir 40 of the enclosure 12. A vent tube 99 extends out of the top of the storage vessel 83 to allow trapped or entrained air to escape. A manually-controlled valve 90 is provided to draw off the liquefied grease and oil from the storage vessel 83. As with the FOG disposal unit 10 described above, water is run from a faucet into the sink and thus into the unit 81 to facilitate the draining of liquefied grease and oil from the storage vessel 83.

A thermostatically-controlled heater can be used with the storage vessel 83 to maintain the grease and oil in a liquefied state.

The storage vessel 83 also functions as a tertiary separator to separate any waste water from the heavier liquefied grease and oil contained therein. Any water content in the liquefied FOG material will gravitate to the bottom of the storage vessel 83 and be drained via a small diameter bleed line 92 back into the bottom 16 of the enclosure 12. The small diameter bleed line 92 ensures that waste liquids drained into the enclosure 12 will cause the waste water and solids to be pushed out of the discharge outlet 50, rather than up the bleed line 92 and into the FOG storage vessel 83.

It is noted that the draw-off valve 90 is located above a specified level of the storage vessel so that only the grease and oil is drained off, and not any water that has been separated from the liquefied grease and oil in the tertiary separator 83. Also, the bottom of the storage vessel 83 is slanted down to a point where the bleed line 92 is connected thereto.

Figure 11:
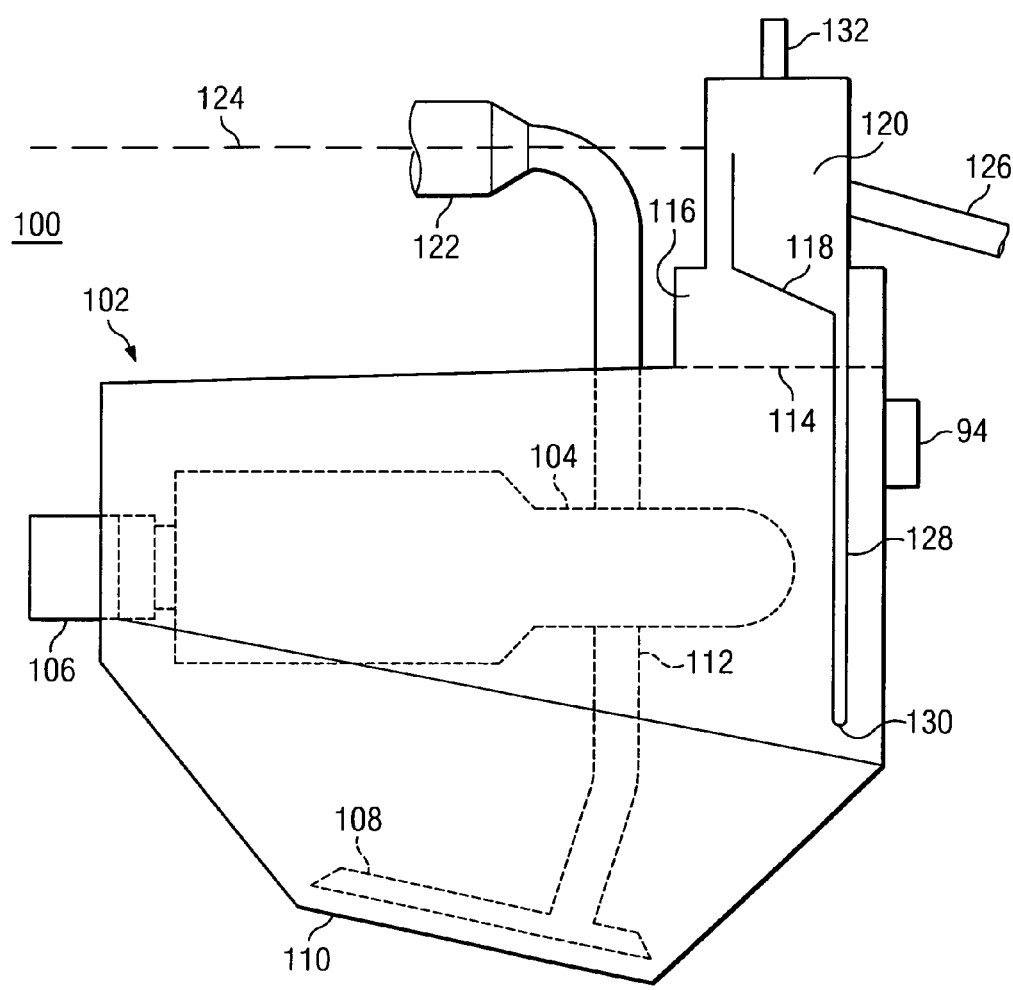
FIG. 11 is a side view of yet another embodiment of a FOG disposal unit.

FIG. 11 illustrates another embodiment of a FOG disposal unit 100 incorporating the principles and concepts of the invention. While not shown, the FOG disposal unit 100 is equipped with legs. The unit 100 includes an enclosure 102 that houses a primary separation chamber comprising a baffle tube 104 of the type described above. The waste liquid is input to the enclosure 102 via an inlet 106. A collection head 108 is located adjacent a V-shaped floor 110 of the enclosure 102 to sweep the solids therefrom and transfer the same with the waste water upwardly in an outlet pipe 112. The outlet pipe 112 is of reduced diameter as compared to inlet 106 to increase the velocity of the waste water carried therethrough. The increased velocity of the waste water in the collection head 108 is effective to suction or sweep the solids that have settled to the bottom of the enclosure 102 in the V-shaped floor 110.

It is noted that in this FOG disposal embodiment 100, the V-shaped floor 110 is slanted downwardly to allow the particulate matter to gravitate to the bottom point. The collection head 108 is also at an angle and adjacent the V-shaped floor 110 so that as the particulate matter gravitates down the V-shaped floor 110, it will move closer to the outlet pipe 112 where the suction is the greatest, and be suctioned or swept away with the waste water up to the discharge outlet 122.

The enclosure 102 comprises a secondary separation chamber for the residual waste water to be separated from the FOG material. The FOG materials that rise to the top of the enclosure 102 move through the perforated baffle plate 114 into a first FOG storage area 116. The first FOG storage area 116 is separated from a second FOG storage area 120 by a weir 118. The top edge of the weir 118 is of an elevation substantially the same as the level of the waste water and solids flowing out of the effluent discharge pipe 122. The level is shown by the broken line 124. Thus, when a waste liquid is drained into the FOG disposal unit 100, the hydrostatic force thereof forces the waste water and solids from the bottom of the enclosure 102 out of the effluent discharge pipe 122, via the collection head 108 and the outlet pipe 112. The rising of the discharged waste water and solids to the level 124 causes FOG liquids that have collected in the first FOG storage area 116 to flow over the weir 118 and into the second storage area 120. After the FOG liquid fills the secondary storage area 120 to a specified level, it spills over into a spout 126 and into a waste disposal container (not shown). If desired, a valve can be fastened to the spout 126.

Any air entrapped in the FOG liquid may be released in either the first storage area 116 or the second storage area 120, and exit via the vent 132. In like manner, any water that may have been carried over by the FOG liquid into the second storage area 120 can be separated therein and be coupled down the internal return conduit 128, which has a bottom end that terminates in the lower part of the enclosure 102 where waste water collects. Any residual water in the FOG liquid thus has an opportunity to be returned to the enclosure 102 and discharged out of the pipe 122.

From the foregoing, FOG disposal apparatus is disclosed for separating the waste water and solids from the FOG liquids. The waste water and solids settle to the bottom of the enclosure, and the FOG liquids are separated and rise to the top of the enclosure. An elongated path within a baffle tube facilitates the separation of the FOG liquids from the waste water and solids. When waste liquids are drained into the FOG disposal unit, a collection head at the bottom of the enclosure is structured to suction the waste water and solids therein, and carry the same to a discharge outlet. Thus, every time waste liquids are drained into the FOG disposal unit, the waste water and solids previously drained therein are automatically suctioned and carried out of the unit. The FOG liquids are stored in a reservoir which is part of the FOG disposal unit. When it is desired to empty the FOG reservoir, then water is drained into the enclosure, which forces the FOG liquids out of the reservoir, via an opened valve. While the FOG disposal units have been disclosed for use in kitchens and other food processing plants, the principles and concepts of the invention can be applied to many other applications.

While the preferred and other embodiments of the invention have been disclosed with reference to specific FOG disposal units, and associated methods thereof, it is to be understood that many changes in detail may be made as a matter of engineering choices without departing from the spirit and scope of the invention, as defined by the appended claims.

What is claimed is:

1. A separator for separating waste water and solids from oils, comprising:
    an enclosure having a side with an inlet formed therein for coupling an influent comprising waste water, solids and oil into the enclosure, where the influent is drained into said enclosure and not pumped under pressure into said enclosure, the oils rising to a top of said enclosure and the waste water and solids migrating to a bottom of said enclosure;
    a discharge outlet formed in a top of said enclosure, said discharge outlet for carrying waste water and solids out of said enclosure, and said discharge outlet located in the top of said enclosure at an elevation higher than said inlet;
    a normally closed FOG outlet formed in a side of said enclosure for coupling oils separated from the waste water and solids out of said enclosure;
    said enclosure having a bottom area to which the solids migrate;
    the top of said enclosure engaging with plural sides, each said side sealed to the top of said enclosure to provide a sealed enclosure during operation except for said inlet and said discharge outlet;
    a collection head located adjacent to said bottom area of said enclosure, said collection head shaped so that liquids drained into said enclosure via said inlet momentarily pressurizes said enclosure and causes the waste water and solids in the bottom area to be suctioned into said collection head and forced out of said discharge outlet;
    an outlet tube connecting the collection head to said discharge outlet; and
    liquid drained into said enclosure via said inlet causes oils separated in said enclosure to move to the top of said enclosure and out of said FOG outlet when said FOG outlet is opened.

2. The separator of claim 1, further including a baffle tube located inside said enclosure, said baffle tube having an input end connected to said inlet, and a capped end, said baffle tube having a first set of perforations therein to allow water and solids to migrate to the bottom of said enclosure, and a second set of perforations to allow oils to migrate to the top of said enclosure.

3. The separator of claim 2, wherein said second set of perforations are located on a top portion of said baffle tube, and said first set of perforations are located on a bottom portion of said baffle tube.

4. The separator of claim 2, wherein said baffle tube is a perforated enclosure which is larger in volume at a downstream portion as compared to an inlet portion thereof.

5. The separator of claim 2, wherein said baffle tube is tubular, with a first diameter at the inlet, a second different diameter at a mid-section and a third different diameter at said capped end.

6. The separator of claim 2, wherein said baffle tube is U-shaped make an effective length thereof longer than a width or length of said enclosure.

7. The separator of claim 2, wherein said baffle tube is located in said enclosure and embedded in waste liquid during operation.

8. The separator of claim 1, wherein said enclosure is closed so as to be full of liquid to the top thereof during operation thereof.

9. The separator of claim 1, wherein said FOG outlet is formed in said enclosure at an elevation lower than said discharge outlet.

10. The separator of claim 1, further including a vent in the top of said enclosure, said vent having a cross-sectional area that allows air to pass therethrough but does not substantially reduce the hydrostatic pressure in said enclosure.

11. The separator of claim 10, wherein said separator is constructed so that the waste water and solids are forced out of said discharge outlet without flowing over a weir.

12. The separator of claim 1, wherein said enclosure bottom includes slanted sides that are angled to said bottom area.

13. The separator of claim 12, wherein said bottom area comprises an elongate junction where two opposing slanted sides are joined, and said junction is V-shaped.

14. The separator of claim 13, wherein said collection head has a length substantially the same as a length of said V-shaped junction.

15. A separator for separating waste water and solids from oils, comprising:
    an enclosure having an inlet for coupling an influent comprising waste water, solids and oil into said enclosure, the oils rising to a top of said enclosure and the waste water and solids migrating to a bottom collection area of said enclosure, said waste water, solids and oil is drained into said enclosure and not pumped under pressure into said enclosure;
    an elongate tube having one end connected to said inlet, said elongate tube having a length sufficient to provide a residence time in which the oils can separate from the waste water, said elongate tube having perforations therein for allowing the oils to migrate upwardly in said enclosure and for allowing the waste water and solids to migrate downwardly in said enclosure;
    a discharge outlet of said enclosure, said discharge outlet for carrying the waste water and solids out of said enclosure, said discharge outlet is located at an elevation higher than said inlet;
    a FOG outlet of said enclosure is opened for coupling oils separated from the waste water and solids out of said enclosure, said FOG outlet is closed during normal operation in which the waste water and solids are removed from said separator, whereby during the normal operation the separated oils continue to collect in said enclosure so that as a volume of the oils increase a volume of the waste water and solids decrease, the separated oils remain in said separator until said FOG outlet is opened;
    an outlet tube connected to said discharge outlet;
    a collection head located adjacent to the bottom collection area of said enclosure, said collection head connected to said outlet tube for carrying the waste water and solids from the bottom collection area of said enclosure to said discharge outlet; and
    when said FOG outlet is closed during the normal operation the only path of liquid and solid flow is through said inlet and said perforated elongate tube into the closed enclosure, up said collection head and said outlet tube and out said discharge outlet.

16. The separator of claim 15, wherein said collection head includes a bottom inlet of a size that causes waste water to be accelerated therethrough when liquids are drained into the inlet of said enclosure, whereby the solids located at said bottom area are suctioned therefrom and out of the discharge outlet.

17. The separator of claim 16, wherein said bottom area of said enclosure is an elongated V-shaped area, and said collection head has a length substantially as long as said V-shaped area.

18. The separator of claim 15, wherein said FOG outlet is located in a top of said enclosure, and further including a normally-closed valve connected to said FOG outlet, said valve opened for drawing off the oils, and said FOG outlet is located at an elevation below said discharge outlet.

19. A method of processing a waste liquid in a separator to separate waste water and solids from oils, comprising:
- draining a waste liquid into an inlet of the separator and through a perforated tube to allow the oils to migrate upwardly through the perforations in said tube, and to allow the waste water and solids to migrate downwardly in said separator through the perforations in said perforated tube;
- draining the waste liquid into the separator so that the liquid in said separator rises and engages a top of said separator so that said separator is full of liquid and has no gas trapped therein;
- during a normal operation of said separator in which the waste water and solids are removed from said separator, maintaining a FOG outlet of said separator closed, whereby separated oils in said separator are maintained in said separator;
- during said normal operation when a waste liquid is drained into said separator, moving liquids through said perforated tube and down to a bottom of said separator and then up a suction tube out of a top of said separator at an elevation above a waste liquid inlet for disposal thereof;
- using a hydraulic force of the waste liquid drained into the separator to cause a suction to be developed in an area at the bottom of the separator to move the waste water and solids upwardly and out of an outlet located in a top portion of said separator; and
- draining off the separated oils from the top of said separator by draining a liquid into the separator with said FOG outlet opened.

20. The method of claim 19, further including preventing the waste water and solids from being removed from the separator when said FOG outlet is opened.

* * * * *